US009028280B2

(12) United States Patent
Poulain et al.

(10) Patent No.: US 9,028,280 B2
(45) Date of Patent: May 12, 2015

(54) ELECTRICAL THREE-PHASE POWER CONNECTOR

(75) Inventors: Charles Poulain, Le Mans (FR); Adrien Chatain, Le Mans (FR); Yohann Guittet, Le Mans (FR)

(73) Assignee: Carrier Kheops BAC, Allonnes (FR)

( * ) Notice: Subject to any disclaimer, the term of this patent is extended or adjusted under 35 U.S.C. 154(b) by 106 days.

(21) Appl. No.: 13/825,551

(22) PCT Filed: Sep. 22, 2011

(86) PCT No.: PCT/FR2011/052186
§ 371 (c)(1),
(2), (4) Date: Mar. 21, 2013

(87) PCT Pub. No.: WO2012/038665
PCT Pub. Date: Mar. 29, 2012

(65) Prior Publication Data

US 2013/0183866 A1 Jul. 18, 2013

(30) Foreign Application Priority Data

Sep. 24, 2010 (FR) ..................................... 10 57694

(51) Int. Cl.

| | |
|---|---|
| ***H02G 15/08*** | (2006.01) |
| ***H01R 13/648*** | (2006.01) |
| ***H01R 13/24*** | (2006.01) |
| ***H01R 13/523*** | (2006.01) |

(52) U.S. Cl.
CPC .......... *H01R 13/648* (2013.01); *H01R 13/2421* (2013.01); *H01R 13/523* (2013.01)

(58) Field of Classification Search
USPC .................................................. 439/693, 201
See application file for complete search history.

(56) References Cited

U.S. PATENT DOCUMENTS

| | | | | |
|---|---|---|---|---|
| 3,271,727 | A * | 9/1966 | Nelson | 439/281 |
| 4,174,875 | A | 11/1979 | Wilson et al. | |
| 5,641,307 | A * | 6/1997 | Gerrans | 439/606 |
| 6,482,036 | B1 * | 11/2002 | Broussard | 439/606 |
| 7,192,313 | B2 * | 3/2007 | Sai | 439/660 |
| 7,470,154 | B2 * | 12/2008 | Sato | 439/693 |
| 2008/0087466 | A1 | 4/2008 | Emerson | |

OTHER PUBLICATIONS

International Search Report and Written Opinion (French) issued by the European Patent Office, dated Jan. 24, 2012, for related International Application No. PCT/FR2011/052186; 10 pages.
Preliminary Research Report (French) dated May 24, 2011, issued by the Institut National De La Propriete Industrielle for related Application No. FR 1057694; 7 pages.

* cited by examiner

*Primary Examiner* — Gary Paumen
(74) *Attorney, Agent, or Firm* — Faegre Baker Daniels LLP

(57) ABSTRACT

A three-phase electric power connector (1), comprising a plug (5) and a socket (3), which each comprise respectively a casing (13, 11) and three electrically conductive contacts (9, 7) housed at least in part inside the casing (13, 11) and each corresponding to an electric phase of the electric current transmitted by the connector (1), in which each of the three electrically conductive contacts (9, 7) is surrounded at least in part by an electrically insulating sheath.

12 Claims, 5 Drawing Sheets

ELECTRICAL THREE-PHASE POWER CONNECTOR

Figure 1:
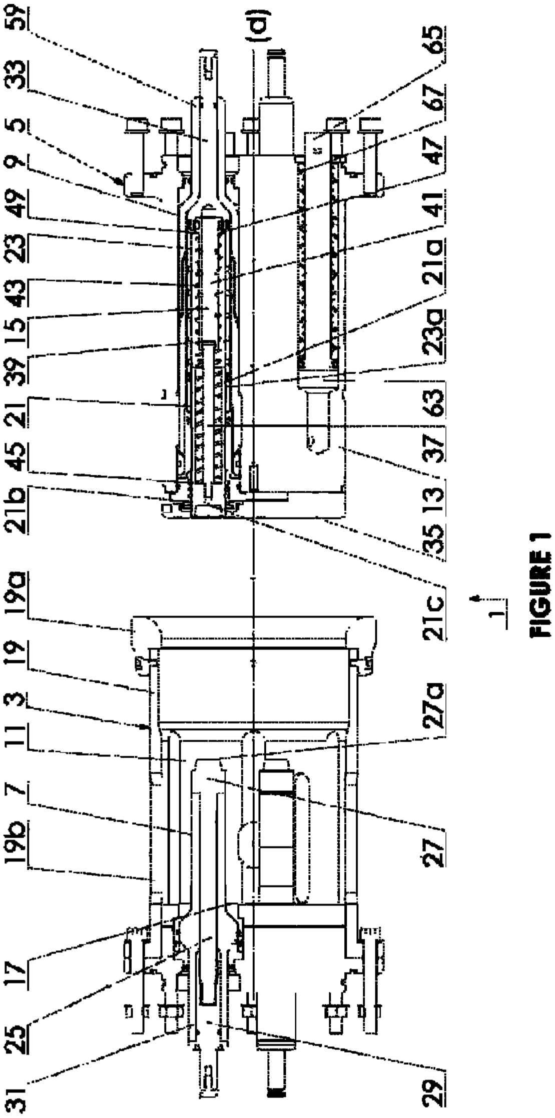

The invention relates to a three-phase electric power connector.

It is known that the short-circuit of a phase within the casing of a three-phase connector affects the other phases, which prevents the electrical equipment supplied by that connector from continuing to function, even in degraded mode, on two phases.

There is therefore a need for a three-phase electric connector of which the functioning is less distorted by the failure of one of the phases.

A three-phase electric power connector is proposed comprising a plug and a socket, which each comprise respectively a casing and three electrically conductive contacts housed at least in part inside the casing and each corresponding to an electric phase of the electric current transmitted by the connector, in which each electrically conductive contact is surrounded at least in part by an electrically insulating sheath.

The result of this is that an anomaly on one phase of the electric connector has little effect on the two other phases of the connector and that the electrical equipment can function in degraded mode on two phases, for example it can continue to rotate an electric motor, and in particular can continue to function while waiting for a repair to re-establish normal operation.

The invention finds a particularly attractive application in offshore oil platforms where repairing an electrical connector can take a great deal of time.

The sheaths of each contact are arranged in such a way that, when the plug and the socket are connected, the sheaths surrounding the contacts of the same phase each form a closed chamber that electrically insulates the contacts of that phase.

Thus, when the plug and the socket are in the connected position, each phase is electrically insulated from the other phases situated inside the connector, this insulation being achieved by the chambers formed by the sheaths.

Advantageously, the sheaths are of tubular configuration each surrounding electrically conductive contacts.

The cross-section of the sheaths is preferably circular and the wall of each of the sheaths surrounds the contact (the electrically conductive portion) at a pre-determined distance, which is sufficient to prevent an electric arc emitted within one of the phases from reaching and interfering with the other phases, equal for example to 0.01 to 5 times the diameter of the contact and preferably equal to 0.3 to 1 times the diameter of the contact.

The wall of each of the sheaths consists of an electrically insulating material, for example a dielectric plastics material. The thickness of each sheath will be determined depending on the voltage of the electric current transmitted by the connector and will advantageously be sufficient for an electric arc not to be able to pass through the wall.

Furthermore, the thickness of each sheath can be determined as a function of the distance of the sheath from the contact so that an electric arc cannot pass through the wall.

Thus, depending on the voltage of the electric current transmitted by the connector, the thickness of the sheath can be combined with the distance of the sheath from the contact so that an electric arc cannot pass through the wall.

In this way, an electric arc emitted within one of the sheath chambers is prevented from crossing the chamber to reach and interfere with the other phases.

Advantageously, each of the sheaths is coated at least in part on the inside and/or the outside by an electric screening layer, for example a metallisation layer or a metal braid connected to an electric earth, which insulates any electrical anomaly of the electromagnetic field on one of the phases that could affect the other phases.

The connector can be used in underwater applications and in this case at least one casing of the plug and/or of the socket of the connector contains electrical insulating oil (dielectric oil), preferably at a higher pressure (by a few bars) relative to the surrounding environment, in particular a marine environment, to prevent any water from entering the connector. Thus, by putting the connector at a higher pressure than the marine environment, the oil can be evacuated outward from the casing (in small quantities) and the tendency for inward migration from the outside environment, with the risk of polluting the oil, can be prevented.

The sheath of a contact may have a plurality of portions, and at least two portions will overlap.

The contacts of the plug will for example be female contact elements, while the contacts of the socket will be male contact elements, said male and female contact elements being designed to cooperate and provide the electrical contact.

The female contact elements are advantageously of the shuttle or piston type, each being fitted with a front cylindrical portion sliding in a complementary tubular contact portion, the front cylindrical portion being pushed in the tubular contact portion by the corresponding male contact element when the connector is connected.

In this type of connector, the sheath of a male contact does not cover the end of the male contact designed to be inserted inside the female contact and the end portion of the sheath (on the connection face side) of the female contact which provides a seal with the outside environment projects sufficiently from the female contact for it to completely cover, in the connected position, the end of the male contact not covered by the sheath.

The sheaths of the female contacts may be in a plurality of portions, and at least two portions will overlap.

Advantageously, the connector comprises sealing means to protect the connector from an external fluid, such as seawater.

The sealing means may consist of the sheath of the conducting cables connected to the contacts, and it is possible for said sheath to be coated with a metallisation layer, which reinforces the seal of the sheath against seawater, in particular at high underwater pressures, and thus protects the connector from water entering between the insulating sheath and the contact. Moreover, the metallisation layer allows better control of the electrical field emitted by the current if there is an electrical voltage surge.

The sealing means may also comprise at least a portion of sheath forming a wiping membrane for contacts of the same phase connected together (for example male and female contacts), suitable for wiping each of the contacts when the connector is connected or disconnected, so that any trace of fluid (seawater or air) is prevented from entering the connector (between the sheath and the contact and/or in the casing) with the risk of affecting the electrical field in this vicinity.

Figure 2:
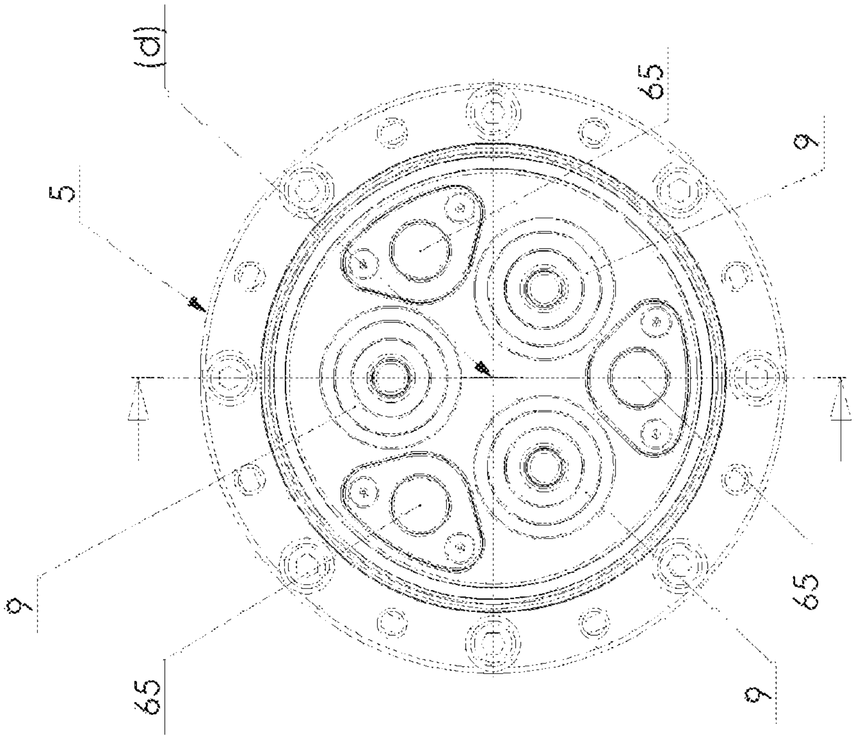
Figure 3:
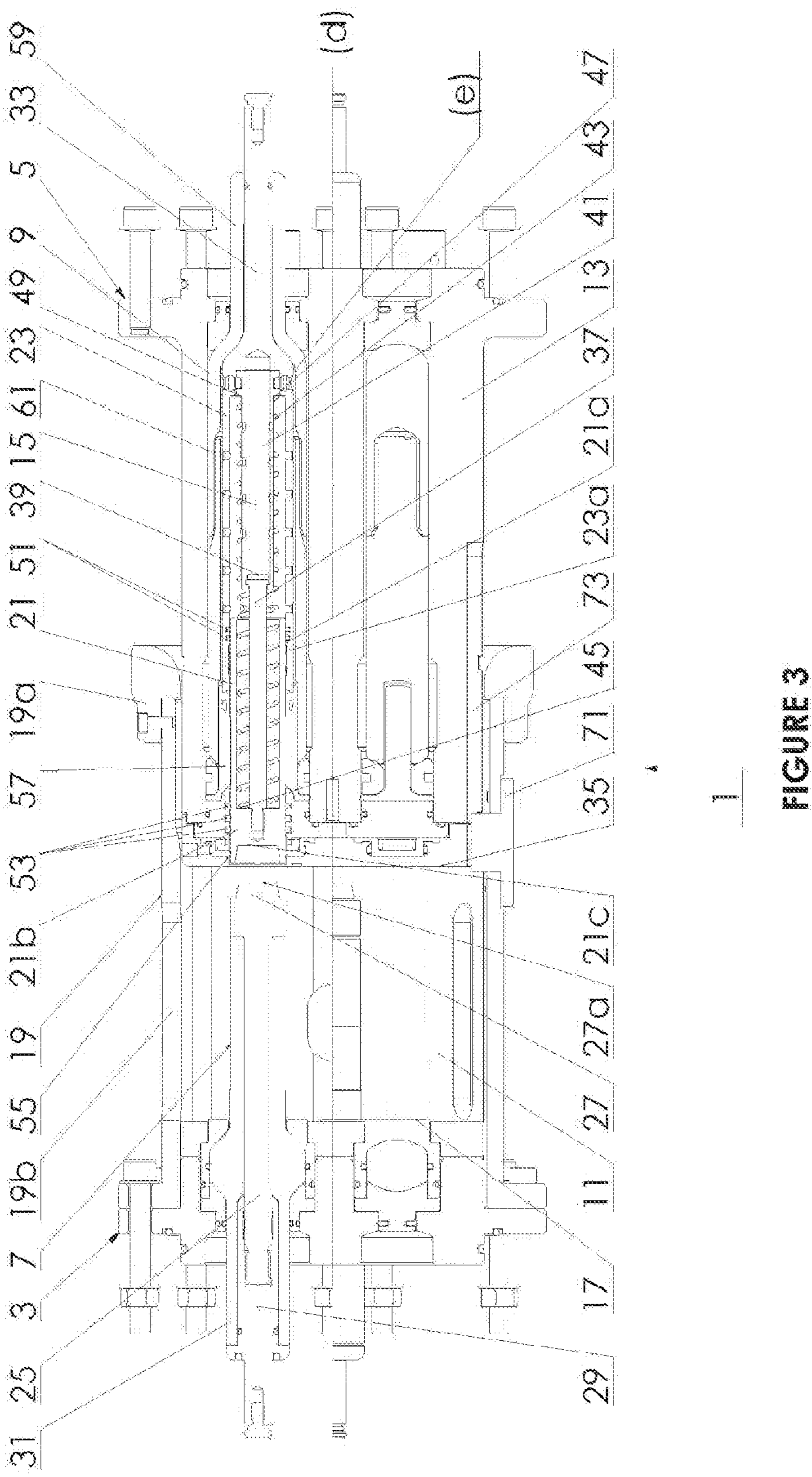
Figure 4:
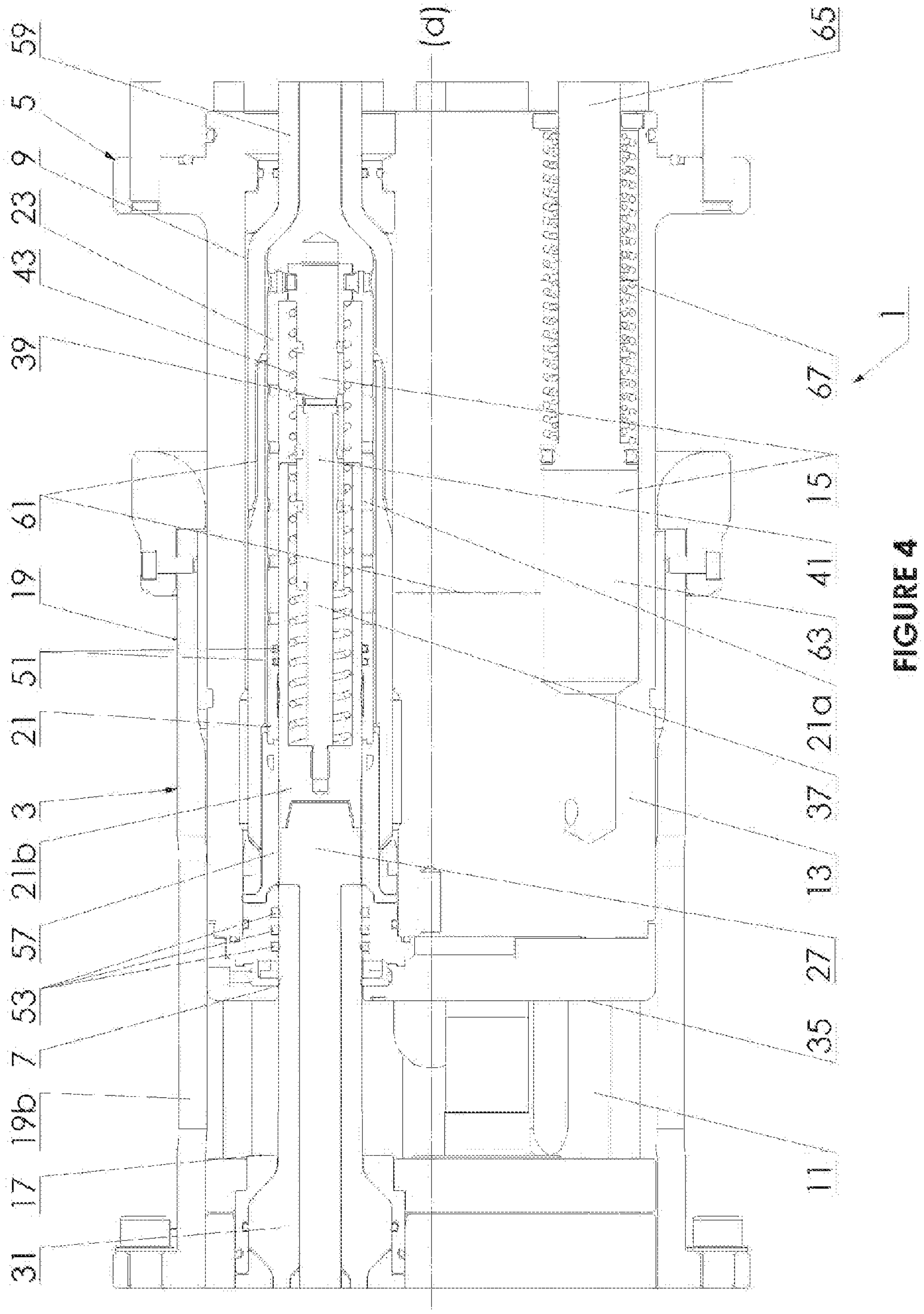
Figure 5:
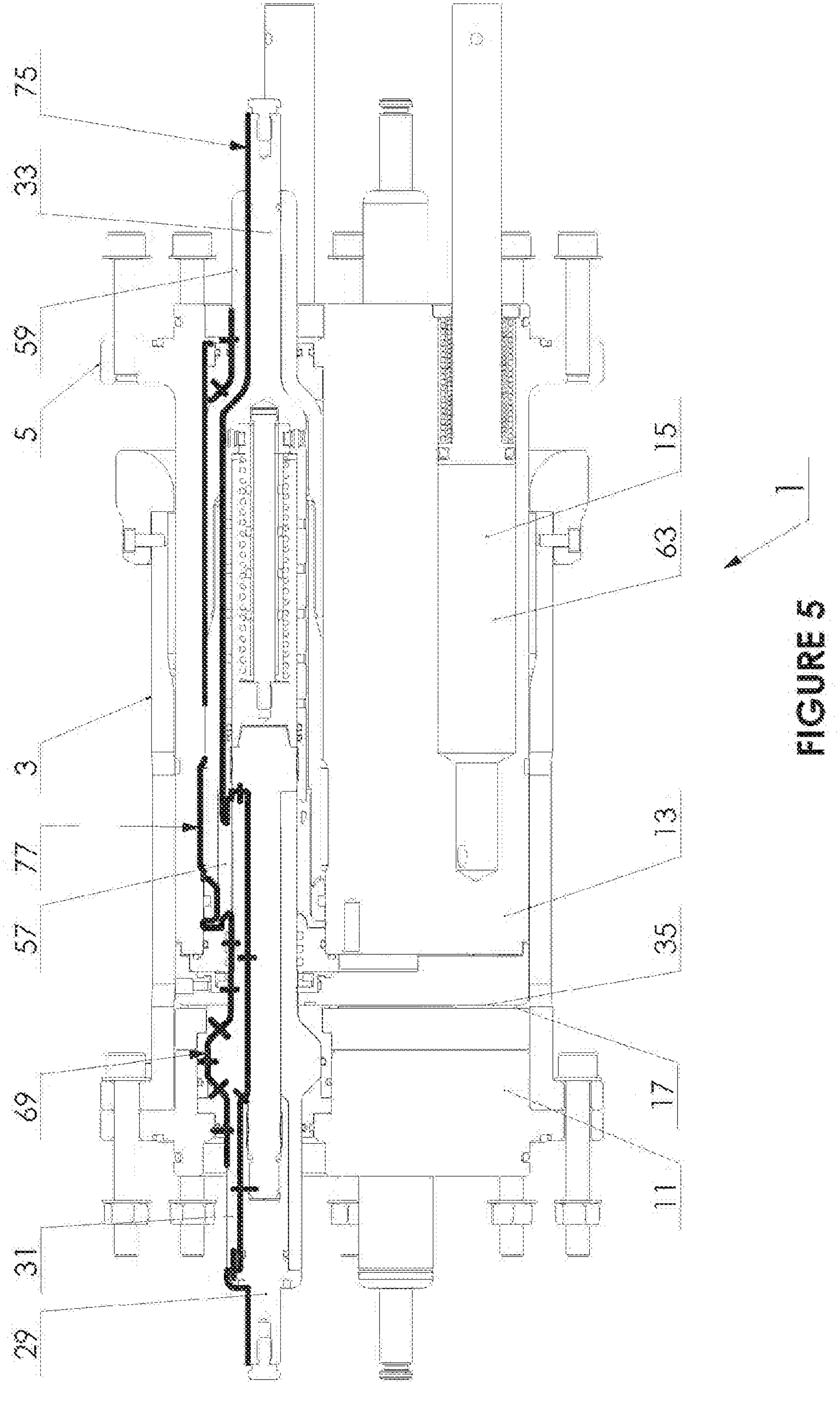

An embodiment of the invention will now be described with reference to the accompanying drawings in which:

FIG. 1 is a view in axial cross-section of an electric connector according to an embodiment of the invention, FIG. 2 is a front view of the back of the plug of the connector of FIG. 1, FIG. 3 is a view in partial axial cross-section of the connector of FIG. 1 during connection, before the male contact elements meet the corresponding female contact elements of the phase, FIG. 4 is a similar view to FIG. 3 where the male contact elements engage and push the corresponding female contact elements, and FIG. 5 is a similar view to FIG. 3 where the connector is connected.

In the figures, identical reference numerals refer to identical or similar elements.

With reference to the drawings, FIG. 1 in particular shows an underwater electric power connector 1 of the shuttle contact type according to an embodiment of the invention. Said connector 1 is an average voltage three-phase power connector, for example to transmit a current of 6 kilovolt to 250 A.

Said connector comprises a socket 3 and a complementary plug 5, which is designed to be coupled to the socket 3 when the connector is connected. The socket 3 comprises three male contact elements 7 and the plug 5 comprises three female contact elements 9 designed to receive and engage the male contact elements 7 in electrical contact. Said contact elements 7, 9 of the socket and of the plug are housed in a respective casing 11, 13 of the socket and of the plug, at least one of the casings 13 containing dielectric oil 15. The contact elements 7, 9 are inscribed in the same circle crosswise to the axis (d) of the casing (FIG. 2), at 120° to each other, a male contact element 7 being in axial correspondence to a female contact element 9.

The three identical phases of the connector are formed when the male 7 and female 9 contact elements are coupled and transmit the electric current.

The three male contact elements 7 mounted in the socket casing 11 project beyond the connection face 17 into a guide portion 19 of the socket (or sleeve portion) adjacent and coaxial to the casing 11 of the socket.

The corresponding three female contact elements 9, housed in the plug casing 13 are flush with the connection face 35. They are of the shuttle or piston type, each being fitted with a front cylindrical portion 21 (on the connection face 35 side) sliding in a complementary tubular contact portion 23, said front cylindrical portion 21 being pushed back into the tubular contact portion 23, inside the casing 13, by the corresponding male contact element 7 when the connector is connected.

The male contact elements 7 of the socket 3 each comprise an inner cylindrical conductive portion 25, a front head 27 (on the connection face 17 side) arranged in the sleeve portion 19, and a rear conductive portion 29 connected to a conducting cable (not illustrated) of the connector.

The inner cylindrical portion 25 is coated with an electrically insulating sheath 31. Said sheath 31 does not cover the end or the head 27 of the male contact designed to be inserted inside the female contact (portion 23).

The female contact elements 9 of the plug 5 each comprise a resilient contact strip 23*a* in the corresponding tubular conductive contact portion 23. Said resilient contact strip 23*a* is designed to receive in internal contact, on connection, the front conductive head 27 of the male contact element 7. A rear cylindrical conductive portion 33 connected to the resilient contact strip 23*a*, and the front cylindrical portion 21 close the connection face 35 of the plug 5 in the disconnected position.

The front cylindrical portion 21 is electrically insulating. It comprises a tubular body 21*a* and a solid front cylindrical portion 21*b*, the front end face 21*c* of which is recessed to complement the front face 27*a* (as a tapering cone) of the front conductive head 27 of the male contact element. A rod 37 provided with a piston 39 at the rear end thereof is mounted coaxial to and integral with the solid front cylindrical portion 21*b*. Said rod 37 extends axially inside the tubular body 21*a* of the insulating front cylindrical portion, projecting from the tubular body 21*a* at the opening thereof. The piston 39 is mounted sliding in a perforated tubular chamber 41 arranged inside the resilient contact strip 23*a*, and coaxial thereto. Said tubular chamber 41 is mounted integral with the resilient contact strip 23*a* by the rear end thereof.

A helical spring 43 is mounted round the piston rod 37 and the tubular chamber 41, resting by a first end 45 on the base of the tubular body 21*a* of the front cylindrical portion and by a second end 47 opposite the previous end on an end shoulder 49 of the tubular chamber 41. Said spring 43 is designed to return the sliding of the front cylindrical portion 21 forwards in the resilient contact strip 23*a*.

The resilient contact strip 23*a* comprises two adjacent wiper O-rings 51 mounted in the bore portion of the resilient contact strip 23*a*. Said wiper rings 51 are arranged close to the front end of the resilient contact strip 23*a*. They are applied to the tubular body 21*a* of the front cylindrical portion 21 and form a barrier to the outward migration of the dielectric oil 15 contained in the casing and to the entry of surrounding fluid into the oil.

Three adjacent annular rings 53 are mounted on the casing 13 near the opening 55 of the corresponding connection face 35 of the plug, coaxial to said opening 55. Said rings 53 form a scraper portion designed to be applied to the electrically insulating front cylindrical portion 21 and to the front head 27 of the male contact element during the connection manoeuvre.

A sheath forming a thick flexible cylindrical membrane 57 is arranged behind said scraper portion 53 extending to the end of the resilient contact strip 23*a* and designed to be applied in compression to the electrically insulating front cylindrical portion 21 and to the front head 27 of the male contact element during the connection manoeuvre. Said membrane 57 allows the tubular body 21 and the head 27 of the male contact to be wiped as they slide on connection and thus prevent any fluid (seawater) from entering in this vicinity. Said thick flexible cylindrical membrane 57 is also electrically insulating.

Said rings 51, 53 and membrane 57 form sealing means to protect the connector from outside fluid.

The resilient contact strip 23*a* and the rear cylindrical conductive portion 33 are also encased in an electrically insulating sheath 59. Said sheath 59 does not cover the end of the rear cylindrical conductive portion 33, which is connected to an electrically conductive cable of the plug (not illustrated).

Arranged between said sheath 59 and the resilient contact strip 23*a* is a uniform clearance space (e) and an escape line 61 for the dielectric oil 15 contained in said resilient contact strip 23*a*. On connection, due to the sliding of the tubular body 21 in the resilient contact strip 23*a* and the corresponding reduction in volume of the space in said tubular body 21 and the resilient contact strip 23*a*, the dielectric oil 15 is transported through the (slotted) resilient contact strip 23*a* and by the escape line 61 to a cylindrical volume compensation chamber 63 formed coaxially in the casing. Said compensation chamber 63 comprises a piston 65 mounted sliding and returned by the spring 67 to the bore of the chamber 63. The piston 65 is displaced in said chamber 63 by the pressure of the dielectric oil 15 transported from the tubular body 21 and the resilient contact strip 23*a*.

The oil 15 of the connector casing is at a slightly higher pressure (by a few bars) than the surrounding outside environment (seawater).

Moreover, the electrically insulating sheath 59 and the sheath 57 of the female contact element 9 which cover one another electrically insulate the resilient contact strip 23*a*, the front cylindrical portion 21 and the rear cylindrical conductive portion 33.

On connection (FIG. 5), the electrically insulating sheaths 31, 57 and 59 of the male contact element 7 and of the female contact element 9 overlap, which forms a continuous electrically insulating chamber for the current phase.

In addition, a silvering layer 69 (metallisation) covers in part the insulated sheaths 31, 59, which for example enables an earth potential line (connected to the electrical earth) to be formed to absorb the voltage peaks at the surface of the chamber and regulate said voltage.

The operation of the connector 1 will now be described.

The plug 5 is inserted in the flared opening 19*a* of the sleeve portion 19 of the socket, indexed at a suitable angle thereto, for example by a wedge 71 and corresponding groove 73 system and is then guided axially by sliding in the sleeve portion 19 (FIG. 3) until the end 27*a* of the front heads 27 of each of the male contact elements is applied to the recessed end 21*c* of the front cylindrical portion 21 of each of the female contact elements. In so doing, the surrounding fluid contained in the sleeve portion 19 is evacuated therefrom through suitable holes or slots 19*b* provided in the wall of said sleeve portion.

The electrically insulating front portion 21 of each of the female contact elements 9 is then translated rearwards (FIG. 4) under the thrust of the corresponding male contact elements 7. The scraper portion formed by the three annular rings 53 wipes the head 27 of the male contact element, while the two wiper rings 51 are applied to the periphery of the tubular body 21*a* of the insulating front cylindrical portion.

The dielectric oil 15 contained in the tubular body and the resilient contact strip 23*a* is then transported through the resilient contact strip 23*a*, by the escape line 61 and by a pathway 61' (shown in the diagram by a dashed and dotted line) to the cylindrical volume compensation chamber 63 associated with each of the female contact elements 9.

When connection is complete, the front connection faces 35, 17 of the plug and of the socket are in mutual contact and each of the contact heads 27 of the male contact elements is applied by the periphery thereof to the bore of the resilient contact strip 23*a* of the female contact element (FIG. 5). The connection is then locked in position by a suitable locking mechanism of the connector, for example by an added retention module (not illustrated). The potential line 75 of the phase current transmitted by the connector is shown as a bold line at the periphery of the electrically conductive portion of the coupled contact elements 7, 9 as is the earth line 77 at the periphery of the electrically insulating layer 31, 57, 59 of the phase. Of course, these potential lines 75, 77 continue and extend in the contiguous conducting cables of the plug and of the base of the connector.

The plug is disconnected from the socket by a reverse manoeuvre to the previous one, the elements functioning in reverse compared with the connection manoeuvre.

The invention claimed is:

1. Three-phase electric power connector comprising a plug and a socket, which each comprise respectively a casing and three electrically conductive contacts housed at least in part inside the casing and each corresponding to an electric phase of the electric current transmitted by the connector in which each of the three electrically conductive contacts is surrounded at least in part by an electrically insulating sheath, in which the sheaths of each contact are arranged in such a way that, when the plug and the base are connected, the sheaths surrounding the contacts of the same phase each form a closed chamber that electrically insulates the contacts of that phase.

2. Three-phase electric power connector according to claim 1, wherein the sheaths are of tubular configuration surrounding each of the electrically conductive contacts.

3. Three-phase electric power connector according to claim 1, wherein the cross-section of the sheaths is circular.

4. Three-phase electric power connector claim 1, wherein each sheath consists of an electric insulating material, such as a dielectric plastics material, the thickness of which depends on the voltage of the electric current transmitted by the connector.

5. Three-phase electric power connector according to claim 1, wherein each sheath is covered at least in part on the inside and/or outside by an electric screening layer, for example a metallisation layer or a metal braid, connected to an electric earth.

6. Three-phase electric power connector according to claim 1, wherein at least one casing of the plug and/or of the socket of the connector contains electrical insulating oil.

7. Three-phase electric power connector according to claim 6, wherein said casing contains electrical insulating oil at a higher pressure relative to the surrounding environment.

8. Three-phase electric power connector according to claim 1, wherein the connector comprises sealing means to protect the connector from an external fluid.

9. Three-phase electric power connector according to claim 1, wherein the contact sheath has a plurality of portions and at least two portions overlap.

10. Three-phase electric power connector according to claim 9, wherein the sealing means comprise at least a portion of sheath forming a wiping membrane for the contacts when the connector is connected or disconnected, so that any trace of fluid (seawater or air) is prevented from entering into the connector, between the contact and the sheath.

11. Three-phase electric power connector according to claim 1, wherein the contacts are female and male contact elements suitable for cooperating with each other, the female contact elements being of the shuttle or piston type, each fitted with a front cylindrical portion sliding into a complementary tubular contact portion, pushed into the tubular contact portion by the corresponding male contact element when connecting the connector.

12. The three-phase electric power connector according to claim 1, wherein each of the insulating sheaths has a continuous length generally equal to a length of the conductive contact positioned within the insulating sheath.

* * * * *